US011209283B2

(12) United States Patent
Hori et al.

(10) Patent No.: US 11,209,283 B2
(45) Date of Patent: Dec. 28, 2021

(54) INFORMATION PROCESSING APPARATUS, INFORMATION PROCESSING SYSTEM, STORAGE UNIT STORING INFORMATION PROCESSING PROGRAM, AND INFORMATION PROCESSING METHOD

(71) Applicant: TOYOTA JIDOSHA KABUSHIKI KAISHA, Toyota (JP)

(72) Inventors: Takashige Hori, Aisai (JP); Ken Ishikawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/561,690

(22) Filed: Sep. 5, 2019

(65) Prior Publication Data

US 2020/0132486 A1 Apr. 30, 2020

(30) Foreign Application Priority Data

Oct. 31, 2018 (JP) .............................. JP2018-205127

(51) Int. Cl.
*G01C 21/34* (2006.01)
*G01C 21/36* (2006.01)

(52) U.S. Cl.
CPC ..... *G01C 21/3484* (2013.01); *G01C 21/3446* (2013.01); *G01C 21/3617* (2013.01)

(58) Field of Classification Search
CPC ............ G01C 21/3484; G01C 21/3446; G01C 21/3617
See application file for complete search history.

(56) References Cited

U.S. PATENT DOCUMENTS

2009/0048775 A1    2/2009  Okude et al.
2014/0088815 A1*   3/2014  Kitagishi .......... B60W 50/0098
                                                   701/29.1
2015/0308846 A1*  10/2015  Ding ..................... G06F 16/444
                                                   701/424
2017/0016737 A1*   1/2017  Takahara .......... G08G 1/096855
2018/0164108 A1*   6/2018  Rahal-Arabi ...... G01C 21/3484
2020/0284601 A1*   9/2020  Myers ................ G01C 21/3484

FOREIGN PATENT DOCUMENTS

JP         2009-042051 A    2/2009

* cited by examiner

*Primary Examiner* — Rami Khatib
(74) *Attorney, Agent, or Firm* — Sughrue Mion, PLLC

(57) ABSTRACT

An information processing apparatus includes an acquisition unit, a controller, and a provision unit. The acquisition unit is configured to acquire behavior information and a request for route retrieval from the vehicle. The controller is configured to decide a plurality of temporary routes in a case where the request for route retrieval is acquired, recognize a manner reference score of each of the temporary routes, recognize an evaluation score of each of a plurality of manner items based on the behavior information acquired from the vehicle having requested the route retrieval, calculate a total evaluation score by using the evaluation score of each of the manner items, and select some of the temporary routes as proposal routes based on comparison between the manner reference score and the total evaluation score. The provision unit is configured to provide the proposal routes to the vehicle having requested the route retrieval.

7 Claims, 9 Drawing Sheets

FIG. 5

```
LINK ID: xxxxx
  MANNER REFERENCE SCORE: MEpt
  EVALUATION SCORE
```

|  | SELECTION | Ave AFTER PASSING | NUMBER OF TIMES | RECOGNITION RATIO |
|---|---|---|---|---|
| SPEED SYNCHRONISM: | 1 | MEp1 ⇒ | n1 | n1/naxxxxx |
| SPEED STABILITY: | 1 | MEp2 ⇒ | n2 | n2/naxxxxx |
| (SLOPE) SPEED STABILITY: | 0 | MEp3 | n3 | n3/naxxxxx |
| (DOWNWARD) BRAKING STABILITY: | 0 | MEp4 | n4 | n4/naxxxxx |
| (LANE) SMOOTHNESS: | 1 | MEp5 ⇒ | n5 | n5/naxxxxx |
| (RIGHT-TURN) SMOOTHNESS: | 0 | MEp6 | n6 | n6/naxxxxx |
| (PASSING) USABILITY: | 0 | MEp7 | n7 | n7/naxxxxx |
| SIGNAL RESPONSIVENESS: | 1 | MEp8 ⇒ | n8 | n8/naxxxxx |
| (CROSSING) STOP: | 1 | MEp9 ⇒ | n9 | n9/naxxxxx |
| (TEMPORARY) STOP: | 1 | MEp10 ⇒ | n10 | n10/naxxxxx |
| (SPEED) COMPLIANCE: | 1 | MEp11 ⇒ | n11 | n11/naxxxxx |

NUMBER OF TIMES OF ACQUISITION: naxxxxx

MEpt = Ave(MEp1, MEp2, MEp5, MEp8, MEp9, MEp10, MEp11)

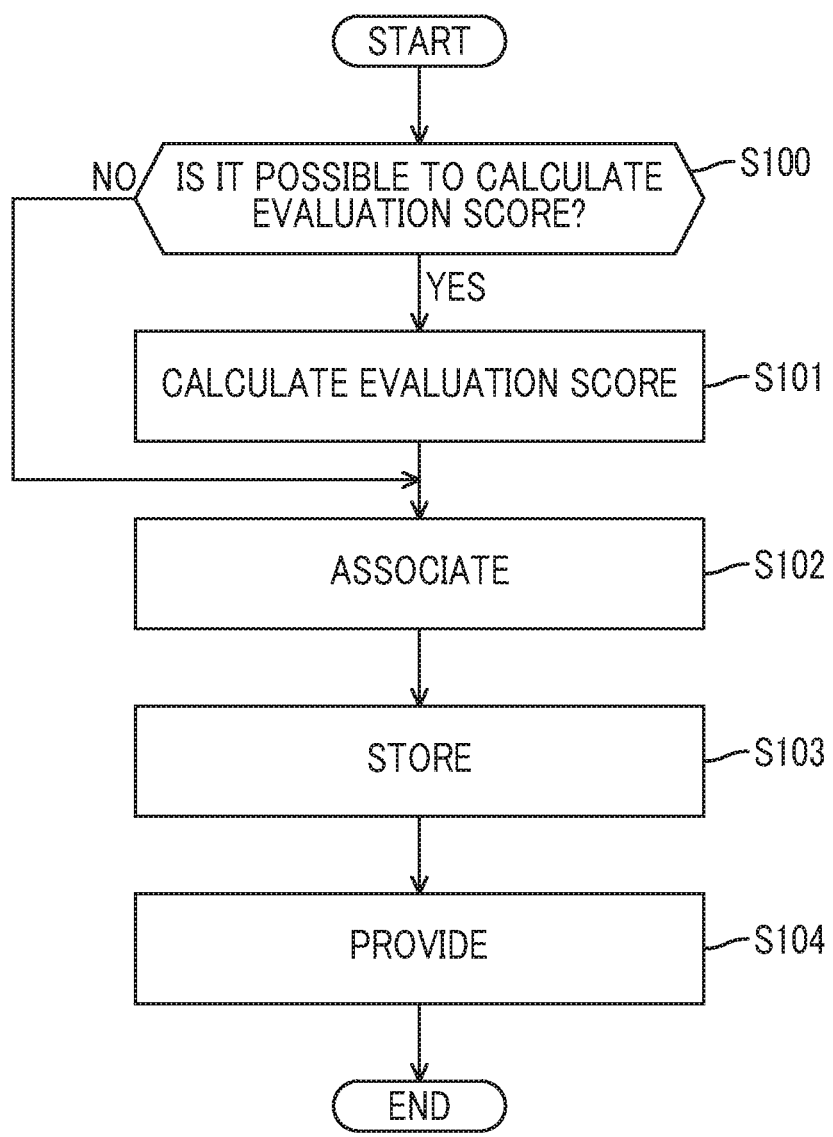

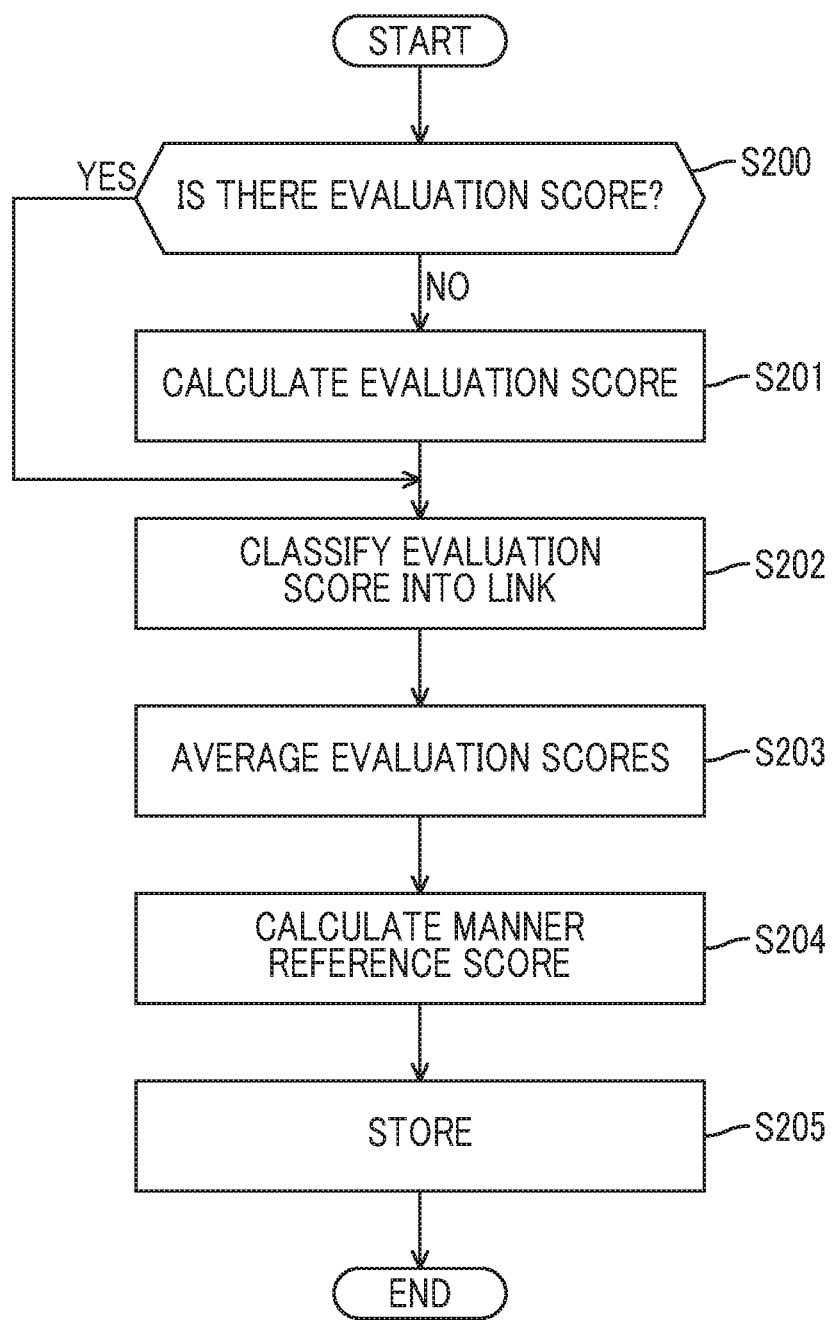

INFORMATION PROCESSING APPARATUS, INFORMATION PROCESSING SYSTEM, STORAGE UNIT STORING INFORMATION PROCESSING PROGRAM, AND INFORMATION PROCESSING METHOD

INCORPORATION BY REFERENCE

The disclosure of Japanese Patent Application No. 2018-205127 filed on Oct. 31, 2018 including the specification, drawings and abstract is incorporated herein by reference in its entirety.

BACKGROUND

1. Technical Field

The present disclosure relates to an information processing apparatus, an information processing system, a storage unit storing an information processing program, and an information processing method.

2. Description of Related Art

In the related art, in route retrieval of a navigation, among a plurality of routes, a single route recommended from the specific viewpoint such as a distance or a time is presented. For example, Japanese Unexamined Patent Application Publication No. 2009-042051 (JP 2009-042051 A) discloses a technique in which a route selection tendency for each attribute (a vehicle model, a sex, an age, and the like) in probe data is accumulated, and, among a plurality of routes, a route that is most likely to be selected for an attribute is presented based on the attribute of a user (a driver or a passenger) in route retrieval of each vehicle. JP 2009-042051 A also discloses a technique in which an attribute of a user is estimated based on an actual route selection tendency of the user for each vehicle, and a route that is most likely to be selected for the attribute is presented.

SUMMARY

An actual attribute or an estimated attribute of a user does not necessarily have the great influence on a route selection tendency. Therefore, a route presented based on such an attribute may not be optimum for a user, and the user may feel uncomfortable.

The present disclosure provides an information processing apparatus, an information processing system, a storage unit storing an information processing program, and an information processing method, capable of presenting a route suitable for a preference for driving of each user.

A first aspect of the present disclosure relates to an information processing apparatus including an acquisition unit configured to acquire behavior information regarding a behavior of a vehicle and a request for route retrieval between two locations from the vehicle; a controller configured to decide a plurality of temporary routes connecting the two locations to each other in a case where the request for route retrieval is acquired, recognize a manner reference score of each of the temporary routes, recognize an evaluation score of each of a plurality of manner items based on the behavior information acquired from the vehicle having requested the route retrieval, calculate a total evaluation score by using the evaluation score of each of the manner items, and select some of the temporary routes as proposal routes based on comparison between the manner reference score and the total evaluation score; and a provision unit configured to provide the proposal routes to the vehicle having requested the route retrieval.

In the information processing apparatus according to the first aspect, the controller may be configured to recognize the manner reference scores of the temporary routes based on the evaluation score of each of the manner items of a vehicle having passed through each of the temporary routes.

In the information processing apparatus according to the first aspect, the controller may be configured to recognize the manner reference scores of the temporary routes based on the evaluation score of each of the manner items of a vehicle before passing through each of the temporary routes.

In the information processing apparatus according to the first aspect, at least some of the manner items used to recognize the manner reference scores of the temporary routes may be defined for each of the temporary routes, and the controller may be configured to calculate the total evaluation score based on evaluation scores of at least some of the manner items used to recognize the manner reference score of each of the temporary routes.

In the information processing apparatus according to the first aspect, the controller may be configured to recognize a recognizable evaluation score of a manner item by using the behavior information whenever the behavior information is acquired, store position information of a vehicle having provided the behavior information in association with the evaluation score, and define a manner item used to recognize the manner reference score of each of the temporary routes based on a ratio of the number of times of recognition of an evaluation score of a manner item associated with position information corresponding to a position included in each of the temporary routes to the number of times of acquisition of the behavior information.

In the information processing apparatus according to the first aspect, the behavior information may include detected information that is detected by a sensor of the vehicle; and the controller may be configured to recognize the evaluation score by calculating the evaluation score of each of the manner items based on the detected information included in the behavior information.

In the information processing apparatus according to the first aspect, the behavior information may include the evaluation score of at least one of the manner items calculated in the vehicle; and the controller may be configured to recognize the evaluation score of the manner item by acquiring the behavior information.

A second aspect of the present disclosure relates to an information processing system including an on-vehicle information processing apparatus that provides behavior information regarding a behavior of a vehicle and a request for route retrieval between two locations; a controller configured to decide a plurality of temporary routes connecting the two locations to each other in a case where the request for route retrieval is acquired, recognize a manner reference score of each of the temporary routes, recognize an evaluation score of each of a plurality of manner items based on the behavior information acquired from the vehicle having requested the route retrieval, calculate a total evaluation score by using the evaluation score of each of the manner items, and select some of the temporary routes as proposal routes based on comparison between the manner reference score and the total evaluation score; and a provision unit configured to provide the proposal routes to the vehicle having requested the route retrieval.

A third aspect of the present disclosure relates to a storage unit storing an information processing program. The information processing program causes an information processing apparatus to execute acquiring behavior information regarding a behavior of a vehicle and a request for route retrieval between two locations from the vehicle; deciding a plurality of temporary routes connecting the two locations to each other in a case where the request for route retrieval is acquired; recognizing a manner reference score of each of the temporary routes; recognizing an evaluation score of each of a plurality of manner items based on the behavior information acquired from the vehicle having requested the route retrieval; calculating a total evaluation score by using the evaluation score of each of the manner items; selecting some of the temporary routes as proposal routes based on comparison between the manner reference score and the total evaluation score; and providing the proposal routes to the vehicle having requested the route retrieval.

A fourth aspect of the present disclosure relates to an information processing method including acquiring behavior information regarding a behavior of a vehicle and a request for route retrieval between two locations from the vehicle; deciding a plurality of temporary routes connecting the two locations to each other in a case where the request for route retrieval is acquired; recognizing a manner reference score of each of the temporary routes; recognizing an evaluation score of each of a plurality of manner items based on the behavior information acquired from the vehicle having requested the route retrieval; calculating a total evaluation score by using the evaluation score of each of the manner items; selecting some of the temporary routes as proposal routes based on comparison between the manner reference score and the total evaluation score; and providing the proposal routes to the vehicle having requested the route retrieval.

According to the respective aspects of the present disclosure, it is possible to present a route more suitable for a preference of each user.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a schematic diagram for describing calculation of a manner reference score, performed by the controller in FIG. 3, based on evaluation scores of some manner items;

FIG. 6 is a flowchart for describing a behavior information providing process executed by a controller in FIG. 2;

FIG. 7 is a flowchart for describing a behavior information acquisition process executed by the controller in FIG. 3;

DETAILED DESCRIPTION OF EMBODIMENTS

Hereinafter, an embodiment will be described with reference to the drawings.

Figure 1:
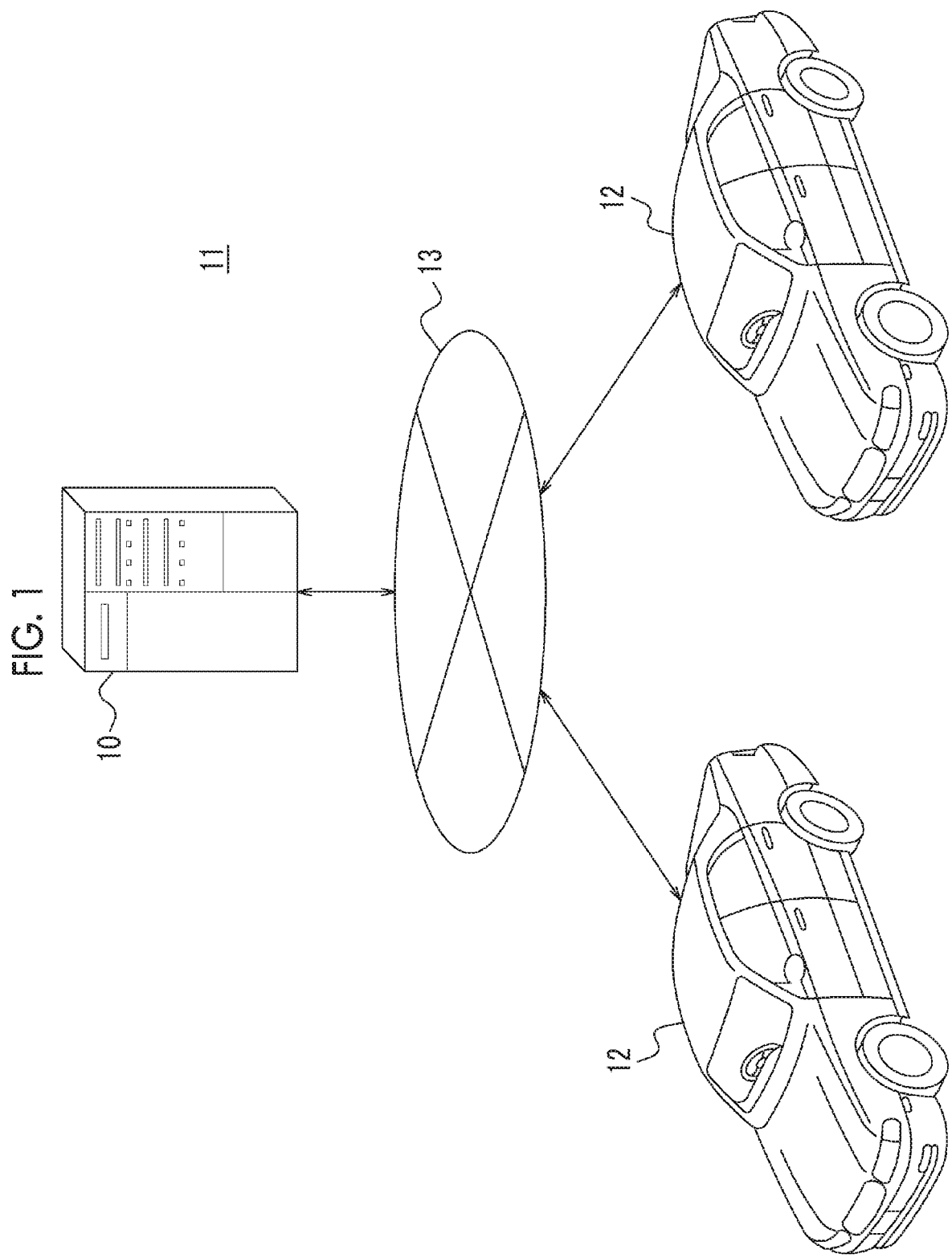
FIG. 1 is a configuration diagram illustrating the overall configuration of an information processing system including an information processing apparatus according to an embodiment.

With reference to FIG. 1, a description will be made of a summary of an information processing system 11 including an information processing apparatus 10 according to an embodiment. The information processing system 11 includes vehicles 12 and the information processing apparatus 10. The vehicles 12 are, for example, automobiles, but are not limited thereto, and may be any vehicles. In FIG. 1, for convenience of description, two vehicles 12 are illustrated, but the number of vehicles 12 included in the information processing system 11 may be one or more. The information processing apparatus 10 includes one or a plurality of, for example, server apparatuses which can perform communication with each other. The vehicles 12 and the information processing apparatus 10 are communicably connected to each other via a network 13 including, for example, a mobile communication network and the Internet.

Each vehicle 12 provides behavior information of the vehicle 12 and a route retrieval request to the information processing apparatus 10. The information processing apparatus 10 accumulates the behavior information provided from the vehicles 12. In a case where the route retrieval request is acquired, the information processing apparatus 10 determines a plurality of temporary routes. The information processing apparatus 10 also recognizes a manner reference score of each of the temporary routes based on the behavior information provided from the vehicles 12. The information processing apparatus 10 recognizes an evaluation score of each of a plurality of manner items based on the behavior information acquired from the vehicle 12 having given the route retrieval request. The information processing apparatus 10 calculates a total evaluation score of the vehicle 12 by using the respective recognized evaluation scores of the manner items. The information processing apparatus 10 selects at least some of the temporary routes as proposal routes based on comparison between the manner reference score and the total evaluation score. The information processing apparatus 10 provides the proposal routes to the vehicle 12.

As mentioned above, according to the present embodiment, an evaluation score of each of a plurality of manner items is recognized based on behavior information in which a user's preference is reflected. A total evaluation score for the user is calculated by using a calculated evaluation score. At least some temporary routes are selected based on comparison between the total evaluation score and a manner reference score recognized for each temporary route, and are proposed to the user. Thus, a more suitable for the user's preference can be presented.

Next, each configuration of the information processing system 11 will be described in detail.

Figure 2:
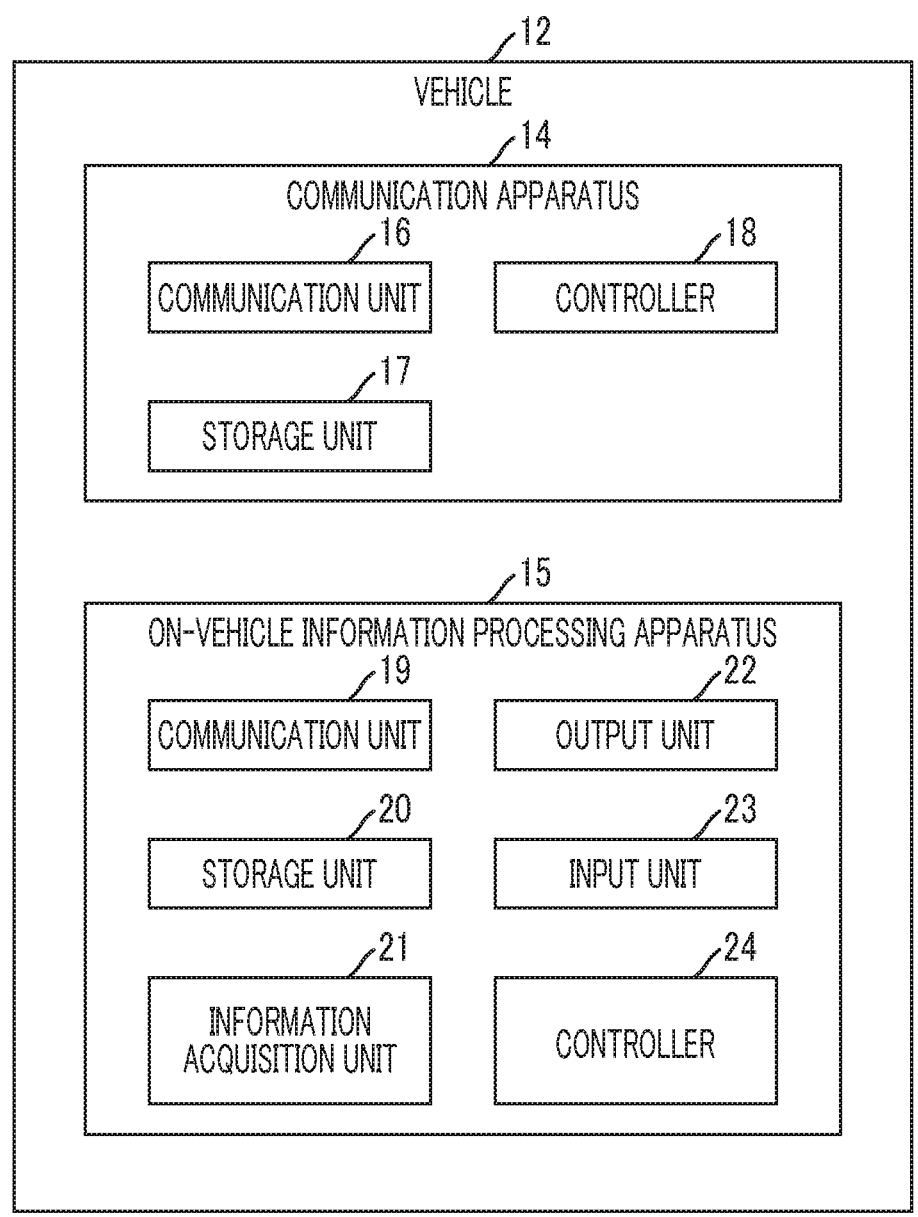
FIG. 2 is a functional block diagram illustrating a schematic configuration of a vehicle in FIG. 1.

As illustrated in FIG. 2, the vehicle 12 includes a communication apparatus 14 and an on-vehicle information processing apparatus 15. The communication apparatus 14 and the on-vehicle information processing apparatus 15 are communicably connected to each other via an on-vehicle network such as a controller area network (CAN) or a dedicated line.

The communication apparatus 14 is an on-vehicle communication machine such as a data communication module (DCM). Specifically, the communication apparatus 14 includes a communication unit 16, a storage unit 17, and a controller 18.

The communication unit 16 includes a communication module which performs communication via an on-vehicle network or a dedicated line. The communication unit 16 includes a communication module connected to the network 13. For example, the communication unit 16 may include a communication module coping with a mobile communication standard such as 4th Generation (4G) or 5th Generation (5G). In the present embodiment, the vehicle 12 is connected to the network 13 via the communication unit 16.

The storage unit 17 includes one or more memories. In the present embodiment, the "memory" is, for example, a semiconductor memory, a magnetic memory, or an optical memory, but is not limited thereto. Each memory included in the storage unit 17 may function as, for example, a main storage device, an auxiliary storage device, or a cache storage device. The storage unit 17 stores any information used for an operation of the communication apparatus 14. The storage unit 17 may store, for example, a system program, an application program, and identification information of the vehicle 12. The identification information of the vehicle 12 is information for enabling the information processing system 11 to uniquely identify the vehicle 12.

When information is transmitted from the communication apparatus 14 to the information processing apparatus 10, the identification information of the vehicle 12 is provided to the information processing apparatus 10 along with the information, and thus the information processing apparatus 10 can identify the vehicle 12 that is a provision source. Here, identification information of the communication apparatus 14 or the on-vehicle information processing apparatus 15 provided in the vehicle 12 may be used as the identification information of the vehicle 12. The information stored in the storage unit 17 may be updated to, for example, information acquired from the network 13 via the communication unit 16.

The controller 18 includes one or more processors. In the present embodiment, the "processor" is a general purpose processor or a dedicated processor specialized to a specific process, but is not limited thereto. The controller 18 controls overall operations of the communication apparatus 14. In the present embodiment, the vehicle 12 performs communication with the information processing apparatus 10 via the communication apparatus 14 controlled by the controller 18. The vehicle 12 acquires and provides information and commands through communication with the information processing apparatus 10.

The on-vehicle information processing apparatus 15 is an apparatus managing various pieces of information in the vehicle 12. For example, the on-vehicle information processing apparatus 15 collects detected information in the vehicle 12 which will be described later. The on-vehicle information processing apparatus 15 provides the collected detected information to the information processing apparatus 10 via the communication apparatus 14 as behavior information without or by processing the detected information. The on-vehicle information processing apparatus 15 includes a communication unit 19, a storage unit 20, an information acquisition unit 21, an output unit 22, an input unit 23, and a controller 24.

The communication unit 19 includes a communication module which performs communication via an on-vehicle network or a dedicated line.

The storage unit 20 includes one or more memories. Each memory included in the storage unit 20 may function as, for example, a main storage device, an auxiliary storage device, or a cache storage device. The storage unit 20 stores any information used for an operation of the on-vehicle information processing apparatus 15. The storage unit 20 may store, for example, a system program, an application program, user identification information associated with a user name, history of detected information for each user, and road map information. The information stored in the storage unit 20 may be updated to, for example, information acquired from the network 13 via the communication apparatus 14.

The information acquisition unit 21 acquires detected information that is detected by various sensors mounted on the vehicle 12 directly or via an electronic control unit (ECU). The detected information is, for example, speed information, position information, braking information, accelerator information, gear position information, traveling distance information, direction indicator information, steering information, distance information, image information, and time information.

The speed information indicates, for example, a speed of the vehicle 12 detected by a speed sensor. The position information indicates, for example, a position of the vehicle 12 on a map, detected by a global positioning system (GPS) receiver. The braking information indicates, for example, an amount of depression of a brake pedal, detected by a brake pedal sensor. The accelerator information indicates an amount of depressing an accelerator pedal, detected by an accelerator position sensor. The gear position information indicates a gear position detected by a gear position sensor. The traveling distance information indicates a traveling distance of the vehicle 12, calculated based on a rotational speed detected by a rotation sensor of a tire. The direction indicator information is, for example, information regarding blinking indication of a direction indicator detected by a direction indicator lever sensor. The steering information indicates, for example, an amount of rotation of a steering wheel detected by a steering angle sensor. The distance information indicates, for example, a distance from another person, detected by a clearance sonar. The image information indicates, for example, an image obtained by imaging the periphery of the vehicle 12 detected by an on-vehicle camera. The time information indicates, for example, a time point at the time detected by a timer.

The output unit 22 includes one or more output interfaces which output information and notify a user thereof. The output interface included in the output unit 22 is, for example, a display outputting information in videos or a speaker outputting information in voices, but is not limited thereto. The display is, for example, a panel display or a head-up display, but is not limited thereto. In the present embodiment, the "video" may include text, a still image, and a moving image.

The input unit 23 includes one or more input interfaces detecting a user's input. The input interface included in the input unit 23 is, for example, a physical key, an electrostatic capacitance key, a touch screen provided integrally with the panel display of the output unit 22, or a microphone detecting voice input, but is not limited thereto.

The controller 24 includes one or more processors. The controller 24 controls overall operations of the on-vehicle information processing apparatus 15.

For example, when an ignition switch is turned on, and thus the vehicle 12 is started, the controller 24 displays an image for requesting the name of a new driving user to be registered or a registered user name to be input on the output unit 22. In a case where the input unit 23 detects input of registering the new user name during display of the image, the controller 24 provides identification information of the new user to the user name. Alternatively, in a case where the input unit 23 detects input of registering the new user name, the controller 24 may provide the user name to the information processing apparatus 10 via the communication apparatus 14 so as to request identification information of the user. In a case where the input unit 23 detects input of a registered user name, the controller 24 reads identification information of the registered user name from the storage unit 20 or the information processing apparatus 10. The controller 24 recognizes the identification information of the user who is a current driver due to input of registration of the new user name or the registered user name The controller 24 associates the identification information of the user with detected information acquired by the information acquisition unit 21 during a period from recognition of the identification information of the user to the next input of registration of a new user name or a registered user name. The controller 24 associates information such as behavior information which will be described later with the identification information of the user, and provides the information to the information processing apparatus 10, during a period from recognition of the identification information of the user to the next input of registration of a new user name or a registered user name.

The controller 24 associates, for example, a plurality of pieces of detected information simultaneously acquired by the information acquisition unit 21 with each other, and stores the pieces of detected information into the storage unit 20. The term "simultaneously" indicates, for example, a period from provision of behavior information periodically provided to the information processing apparatus 10, which will be described later, to the next provision. In a case where the detected information is acquired, the controller 24 may calculate an evaluation score of a manner item which will be described later by also using the past detected information stored in the storage unit 20.

The controller 24 provides at least one of the detected information temporarily stored in the storage unit 20 and the evaluation score of the manner item to the information processing apparatus 10 as behavior information regarding a behavior of the vehicle 12. The controller 24 causes at least position information to be included in the behavior information, and provides the behavior information to the information processing apparatus 10. The controller 24, for example, periodically provides the behavior information to the information processing apparatus 10. Provision of the behavior information from the controller 24 to the information processing apparatus 10 is not limited to a periodic manner, may be performed at any time, and may be performed regularly or whenever a specific condition such as calculation of an evaluation score of a manner item is satisfied.

In a case where the input unit 23 detects input of requesting route retrieval, the controller 24 provides a request for route retrieval between two locations including positions of a departure location and an arrival location, to the information processing apparatus 10. In a case where a proposal route is acquired from the information processing apparatus 10 in response to the request for route retrieval, the controller 24 outputs the proposal route to the output unit 22 so as to inform the user of the proposal route.

Figure 3:
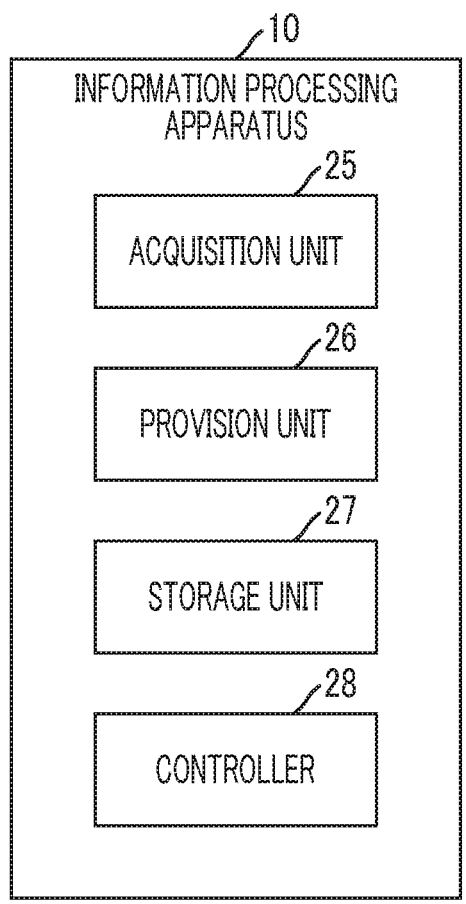
FIG. 3 is a functional block diagram illustrating a schematic configuration of the information processing apparatus in FIG. 1.

As illustrated in FIG. 3, the information processing apparatus 10 includes an acquisition unit 25, a provision unit 26, a storage unit 27, and a controller 28.

The acquisition unit 25 includes, for example, a communication module connected to the network 13. The acquisition unit 25 may include, for example, a communication module coping with a wired local area network (LAN) standard. In the present embodiment, the information processing apparatus 10 is connected to the network 13 via the acquisition unit 25. The acquisition unit 25 may acquire behavior information and a request for route retrieval between two locations from the vehicle 12.

The provision unit 26 includes, for example, a communication module connected to the network 13. The provision unit 26 may include, for example, a communication module coping with a wired LAN standard. The provision unit 26 provides, for example, various pieces of information such as a proposal route which will be described later, and commands to the vehicle 12. The provision unit 26 may be provided integrally with the acquisition unit 25.

The storage unit 27 includes one or more memories. Each memory included in the storage unit 27 may function as, for example, a main storage device, an auxiliary storage device, or a cache storage device. The storage unit 27 stores any information used for an operation of the information processing apparatus 10. The storage unit 27 may store, for example, a system program, an application program, history of detected information for each user, a calculation expression for a manner reference score, the number of times of acquisition of behavior information classified for each link, the number of times of recognizing an evaluation score of a manner item classified for each link, a link and a node, and an evaluation score classified for each link. The node is a linkage point such as an intersection in a road network. The link is a road section connecting adjacent nodes to each other. Therefore, various routes are formed by combinations of various nodes and various links. The information stored in the storage unit 27 may be updated to, for example, information acquired from the network 13 via the acquisition unit 25.

The controller 28 includes one or more processors. The controller 28 controls overall operations of the information processing apparatus 10.

Figure 4:
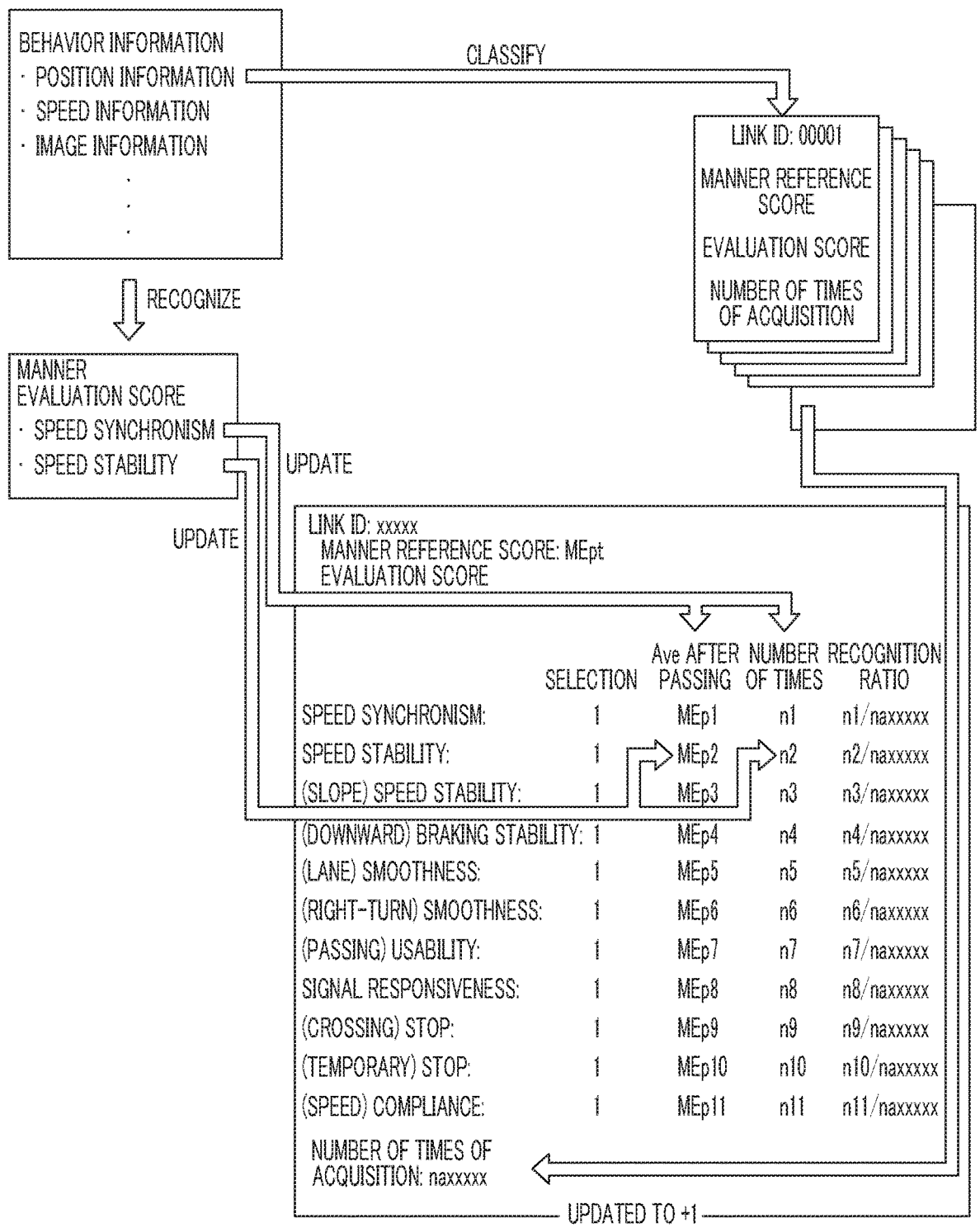
FIG. 4 is a schematic diagram for describing update of the number of times of acquisition of behavior information performed whenever a controller in FIG. 3 acquires the behavior information and averaging performed whenever an evaluation score is recognized.

As illustrated in FIG. 4, for example, whenever behavior information is acquired from the on-vehicle information processing apparatus 15, the controller 28 classifies the behavior information into links corresponding to position information included in the behavior information, and updates the counted number of times of acquisition of behavior information for each link (refer to "updated to +1"). The controller 28 stores the updated number of times of acquisition into the storage unit 27.

In data of the link ID: xxxxx on a lower part of FIG. 4, a "manner reference score" is a manner reference score, which will be described later, calculated based on an evaluation score for the vehicle 12 having passed through a link. An "evaluation score" indicates "selection", "Ave after passing", the "number of times", and a "recognition ratio" for an evaluation score of each manner item. The "selection" indicates whether or not an item is to be used for calculation of a manner reference score which will be described later, 1 indicates that the item is to be used, and 0 indicates that the item is not to be used. The "Ave after passing" is an average value of evaluation scores recognized based on behavior information acquired from the vehicle 12 having passed through the link. The "number of times" is the number of times of recognizing an evaluation score based on behavior information acquired from the vehicle 12 having passed through the link. The "recognition ratio" is a recognition ratio for each manner item which will be described later. The "number of times of acquisition" is the number of times of acquisition of behavior information.

For example, in a case where an evaluation score can be recognized by using at least behavior information acquired from the on-vehicle information processing apparatus 15, the controller 28 recognizes an evaluation score of a manner item of the vehicle 12 providing the behavior information whenever the behavior information is acquired. The recognition of an evaluation score of a manner item in the controller 28 may be performed according to at least one of calculation of the evaluation score of the manner item and acquisition of the evaluation score of the manner item. For example, in a case where behavior information includes detected information, the controller 28 calculates a calculable evaluation score of a manner item by using at least the detected information, and, as needed, further using the history of detected information stored in the storage unit 27. For example, in a case where behavior information includes an evaluation score of a manner item calculated by the on-vehicle information processing apparatus 15, the controller 28 acquires the behavior information so as to recognize the evaluation score of the manner item.

The manner item is a user's driving characteristic influencing a smooth traffic flow. The evaluation score of the manner item is a score which indexes the driving characteristic, and a calculation method for each manner item is defined in advance. Alternatively, the evaluation score of the manner item may be automatically learned through machine learning of an item influencing a smooth traffic flow and an evaluation method.

User's driving characteristics influencing a smooth traffic flow include, for example, user's driving characteristics contributing to a smooth traffic flow and user's driving characteristics hindering the smooth traffic flow. The user's driving characteristics contributing to the smooth traffic flow are, for example, speed synchronism, speed stability, speed stability in slope switching, braking stability at a downward slope, smoothness in lane changing, smoothness in right-turn preparation, the usability of a passing lane, smoothness in merging, and signal responsiveness. The user's driving characteristics hindering the smooth traffic flow are, for example, complete stop at a pedestrian crossing, complete stop at a temporary standstill, and full compliance with a speed limit.

The speed synchronism is the degree of synchronism of a vehicle speed of a certain vehicle 12 with peripheral vehicles 12. An evaluation score of the speed synchronism is set, for example, in a range from 0 points to 10 points, and is set to come closer to 10 points as a value obtained by dividing an absolute value of a difference between a vehicle speed of the certain vehicle 12 and an average vehicle speed of the peripheral vehicles 12 by the average vehicle speed comes closer to zero, and is set to come closer to 0 points as the value becomes more distant from zero. The controller 28 calculates an evaluation score of the speed synchronism based on, for example, speed information acquired from the certain vehicle 12 and speed information acquired from another vehicle 12 associated with a link at a position where the former speed information is acquired.

The speed stability is the degree of constant vehicle speed during cruise traveling of a certain vehicle 12. The cruise traveling is a traveling state after acceleration from a stop state is equal to or less than an acceleration threshold value until deceleration for stopping is equal to or more than a deceleration threshold value. An evaluation score of the speed stability is set, for example, in a range from 0 points to 10 points, and is set to come closer to 10 points as a variance of a vehicle speed during cruise traveling comes closer to 0, and is set to come closer to 0 points as the variance increases. The controller 28 determines whether or not a certain vehicle 12 is in a cruise traveling state based on speed information acquired from the certain vehicle 12, and calculates an evaluation score of the speed stability based on speed information during cruise traveling.

The speed stability in slope switching is the degree of constant vehicle speed at the time of switching between inclinations of a road on which a certain vehicle 12 is traveling. Switching to a slope is, for example, switching to an upward slope or a downward slope from a flat road, switching to a flat road or a downward slope from an upward slope, and switching to a flat road or an upward slope from a downward slope. An evaluation score of the speed stability in slope switching is set, for example, in a range from 0 points to 10 points, and is set to come closer to 10 points as a change in a vehicle speed before and after switching between inclinations comes closer to 0, and is set to come closer to 0 points as the change increases. The controller 28 determines whether or not there is switching between inclinations of a road based on position information and road map information acquired from the certain vehicle 12, and calculates an evaluation score of the speed stability in slope switching based on speed information before and after switching between the inclinations.

The braking stability at a downward slope is the degree of suppression of the use of a foot brake at a downward slope on which a certain vehicle 12 is traveling. An evaluation score of the braking stability at a downward slope is set, for example, in a range from 0 points to 10 points, and is set to come closer to 10 points as each of the number of times of depression and an amount of depression of a foot brake per distance during traveling on a downward slope decreases, and a traveling distance in a state in which an engine brake is applied increases, and is set to come closer to 0 points as the number of times of depression and an amount of depression increases, and a traveling distance in a state in which the engine brake is applied decreases. The controller 28 determines whether or not a certain vehicle 12 is traveling on a downward slope based on, for example, position information and road map information acquired from the certain vehicle 12, and calculates an evaluation score of the braking stability at a downward slope based on braking information, accelerator information, gear position information, and traveling distance information.

The smoothness in lane changing is the degree of suppressing hindrance of traveling of other vehicles 12 from preparation of lane changing of a certain vehicle 12 to completion of lane changing. An evaluation score of the smoothness in lane changing is set, for example, in a range from 0 points to 10 points, and is set to come closer to 10 points as a time until lane changing is executed from blinking of a direction indicator becomes longer and deceleration of the following vehicle 12 in a lane before lane changing decreases, and is set to come closer to 0 points as the time becomes shorter and the deceleration increases. For example, in a case where the controller 28 determines that the certain vehicle 12 is changing a lane based on steering information and speed information acquired from the certain vehicle 12, the controller 28 calculates an evaluation score of the smoothness in lane changing based on direction indicator information, time information, and image information or speed information acquired from the following vehicle 12 of the certain vehicle 12.

The smoothness in right-turn preparation is the degree of suppressing hindrance of traveling of other vehicles 12 during right-turn standby of a certain vehicle 12 at an intersection without a right-turn lane. An evaluation score of the smoothness in right-turn preparation is set, for example, in a range from 0 points to 10 points, and is set to come closer to 10 points as intersection passing time of the vehicle 12 on an opposite lane and the following vehicle 12 becomes shorter with respect to the vehicle 12 of which a direction indicator blinks at an intersection without a right-turn lane, and is set to come closer to 0 points as the time becomes longer. The intersection passing time is, for example, time taken for another vehicle 12 to pass between the frontmost part and the rearmost part of the certain vehicle 12. In a case where the controller 28 determines that the certain vehicle 12 is at right-turn standby based on, for example, position information and direction indicator information acquired from the certain vehicle 12, the controller 28 calculates an evaluation score of the smoothness in right-turn preparation based on image information and time interference, or position information and time information that are acquired from another vehicle 12.

The usability of a passing lane is the degree of suppressing hindrance of traveling of other vehicles 12 due to traveling of a certain vehicle 12 on a passing lane of a highway. An evaluation score of the usability of a passing lane is set, for example, in a range from 0 points to 10 points, and is set to come closer to 10 points as the number of times of starting staying of the following vehicle 12 per passing lane traveling time decreases and staying time of the following vehicle 12 becomes shorter, and is set to come closer to 0 points as the number of times increases and the staying time becomes longer. The staying of the following vehicle 12 indicates a case where a reduction in a vehicle speed of the following vehicle 12 is equal to or more than, for example, 5% before and after a vehicle speed of the following vehicle 12 of the certain vehicle 12 leads to an appropriate inter-vehicle distance or less for the certain vehicle 12. The appropriate inter-vehicle distance is a distance which changes depending on a vehicle speed of the certain vehicle 12. In a case where the controller 28 determines that the certain vehicle 12 is traveling on a passing lane of a highway based on image information acquired from the certain vehicle 12, the controller 28 determines the occurrence of staying of the following vehicle 12 based on an image signal, or speed information acquired from the following vehicle 12. In a case where the controller 28 determines the occurrence of staying of the following vehicle 12, the controller 28 calculates an evaluation score of the usability of a passing lane based on image information and time information acquired from the certain vehicle 12, or speed information and image information acquired from the following vehicle 12.

The smoothness in merging is the degree of suppressing hindrance of traveling of other vehicles 12 on a merging lane due to merging of a certain vehicle 12. An evaluation score of the smoothness in merging is set, for example, in a range from 0 points to 10 points, and is set to come closer to 10 points as the frequency of decelerating other vehicles 12 which are traveling on a merging lane becomes lower and deceleration of the other vehicles 12 decreases, and is set to come closer to 0 points as the frequency becomes higher and the deceleration increases. In a case where the controller 28 determines that the certain vehicle 12 is traveling on a merging lane based on image information acquired from the certain vehicle 12, the controller 28 calculates an evaluation score of the smoothness in merging based on the image information acquired from the certain vehicle 12, or speed information, braking information, and time information acquired from another vehicle 12.

The signal responsiveness is a responsive speed up to starting after a red traffic signal is changed to a blue traffic signal such that hindrance of traveling of other vehicles 12 due to starting delay can be suppressed. An evaluation score of the signal responsiveness is set, for example, in a range from 0 points to 10 points, and is set to come closer to 10 points as time until a certain vehicle 12 is actually started from the time at which the certain vehicle 12 can be started after a traffic signal is changed to a blue traffic signal becomes shorter, and is set to come closer to 0 points as the time becomes longer. The time at which the certain vehicle 12 can be started after a traffic signal is changed to a blue traffic signal is the time at which a traffic signal is changed to a blue traffic signal in a case where the certain vehicle 12 is the foremost vehicle at an intersection, and is the time at which the preceding vehicle 12 is started in a case where the preceding vehicle is stopped in front of the certain vehicle 12. The controller 28 calculates an evaluation score of the signal responsiveness based on image information and time information acquired from the certain vehicle 12.

The complete stop at a pedestrian crossing is the degree to which a certain vehicle 12 is completely stopped at a pedestrian crossing without a traffic signal. The complete stop indicates a state in which a speed is 0 km/h without including low-speed traveling. An evaluation score of the complete stop at a pedestrian crossing is set, for example, in a range from 0 points to 10 points, and is set to come closer to 10 points as the frequency of complete stop per the number of times of passing through a pedestrian crossing decreases, and is set to come closer to 0 points as the frequency increases. In a case where the controller 28 determines that the certain vehicle 12 passes through a pedestrian crossing based on position information and road map information acquired from the certain vehicle 12, the controller 28 calculates an evaluation score of the complete stop at a pedestrian crossing based on braking information or speed information.

The complete stop at a temporary standstill is the degree to which a certain vehicle 12 is completely stopped at a stop line for temporary standstill. An evaluation score of the complete stop at a temporary standstill is set, for example, in a range from 0 points to 10 points, and is set to come closer to 10 points as the frequency of complete stop per the number of times of passing through a stop line for temporary standstill decreases, and is set to come closer to 0 points as the frequency increases. In a case where the controller 28 determines that the certain vehicle 12 passes through a stop line for temporary standstill based on position information and road map information acquired from the certain vehicle 12, the controller 28 calculates an evaluation score of the complete stop at a temporary standstill based on braking information or speed information.

The full compliance with a speed limit is the degree to which a certain vehicle 12 complies with a speed limit of a road during traveling. An evaluation score of the full compliance with a speed limit is set, for example, in a range from 0 points to 10 points, and is set to come closer to 10 points as a traveling time at a speed limit or lower becomes shorter, and is set to come closer to 0 points as the traveling time becomes longer. The controller 28 calculates an evaluation score of the full compliance with a speed limit based on position information, road map information, and speed information acquired from the certain vehicle 12.

In a case where the evaluation scores of the respective manner items are recognized based on behavior information (refer to "recognition"), the information processing apparatus 10 classifies the evaluation scores into links corresponding to position information included in the behavior information. The controller 28 averages the classified evaluation scores of the respective manner items for each link whenever pieces of behavior information are acquired from the vehicles 12 (refer to "update" of "Ave after passing"). The controller 28 updates the number of times of recognition of the classified evaluation scores for each link (refer to "update" of the "number of times"). The controller 28 stores the evaluation score of each manner item averaged for each link and the number of times of update into the storage unit 27.

The evaluation score of each manner item averaged for each link is used to calculate a manner reference score of a temporary route which will be described later. The controller 28 may calculate a manner reference score at any time, and may calculate a manner reference score when a route retrieval request which will be described later is acquired. The manner reference score is an index for totally evaluating a plurality of manner items of an average vehicle 12 that is scheduled to pass or has passed along a temporary route.

In a configuration in which the manner reference score is calculated at any time, the controller 28 calculates a manner reference score of a certain link by using the averaged evaluation score of each manner item for the certain link, stored in the storage unit 27, that is, evaluation scores of manner items of the vehicle 12 having passed through the certain link.

The controller 28 calculates the manner reference score by averaging evaluation scores of all of the manner items. Alternatively, the controller 28 may calculate the manner reference score based on at least some of the manner items instead of using the evaluation scores of all of the manner items. A manner item used to calculate the manner reference score may be artificially defined during design. Alternatively, a manner item used to calculate the manner reference score may be automatically defined.

The controller 28 may automatically define a manner item used to calculate the manner reference score based on a ratio (hereinafter, referred to as a "recognition ratio" in some cases) of the number of times of recognition of an evaluation score of a manner item classified into each link to the number of times of acquisition of behavior information for each link. Since a temporary route which will be described later includes at least one link, it can be said that the controller 28 defines at least some manner items used to calculate (recognize) a manner reference score of the temporary route based on a ratio of the number of times of recognition of an evaluation score of a manner item associated with position information corresponding to a position included in the temporary route to the number of times of acquisition of behavior information.

For example, in a case where a recognition ratio of an evaluation score of a certain manner item is low for a certain link, the controller 28 excludes the evaluation score of the certain manner item from calculation of a manner reference score of the certain link. More specifically, in a case where a recognition ratio of an evaluation score of a certain manner item is equal to or less than a recognition threshold value for a certain link, the controller 28 decides that the evaluation score of the certain manner item is excluded from calculation of a manner reference score of the link. For example, in a case where a recognition ratio of an evaluation score of a certain manner item is high for a certain link, the controller 28 applies the evaluation score of the certain manner item to calculation of a manner reference score of the certain link. More specifically, in a case where a recognition ratio of an evaluation score of a certain manner item is more than a recognition threshold value for a certain link, the controller 28 decides that the evaluation score of the certain manner item is applied to calculation of a manner reference score of the link.

In a case where manner items used to calculate a manner reference score of each link is decided, the controller 28 calculates the manner reference score of each link by averaging evaluation scores of all of the manner items decided to be used to calculate the manner reference score. For example, as illustrated in FIG. 5, in a case where the controller 28 decides that, for a certain link, the speed synchronism, the speed stability, the smoothness in lane changing, the signal responsiveness, the complete stop at a pedestrian crossing, the complete stop at a temporary standstill, and the full compliance with a speed limit are applied to calculation of a manner reference score of the link, the controller 28 calculates a manner reference score MEpt of the link by averaging evaluation scores MEp1, MEp2, MEp5, MEp8, MEp9, MEp10, and MEp11 of the respective manner items. The controller 28 stores the calculated manner reference score into the storage unit 27.

In a case where a request for route retrieval between two locations is acquired from a certain vehicle 12, the controller 28 decides a plurality of temporary routes connecting the two locations to each other. The controller 28 decides the temporary routes by deciding, for example, links and nodes forming the temporary routes. In a case where there is a single route connecting the two locations to each other, the controller 28 provides the single route to the vehicle 12 as a proposal route without deciding a temporary route.

In a case where the temporary routes are decided, the controller 28 recognizes a manner reference score of each of the temporary routes as will be described below. The controller 28 may recognize a manner reference score by using, for example, an average value of evaluation scores of a plurality of manner items of the vehicle 12 having passed through a temporary route. The average value of evaluation scores of a plurality of manner items of the vehicle 12 having passed through a temporary route is used for recognition, for example, by reading a calculated manner reference score of each link forming the temporary route, stored in the storage unit 27. Alternatively, when a route retrieval request is acquired, the controller 28 may recognize a manner reference score by calculating the manner reference score by using an average value of evaluation scores of manner items of the vehicle 12 before passing through the temporary route.

The vehicle 12 before passing through the temporary route is, for example, the vehicle 12 to which the controller 28 provides the temporary route as a proposal route and which does not pass through the route yet. The vehicle 12 before passing through the temporary route is, for example, the vehicle 12 in which a scheduled traveling route created by the vehicle 12 and sent to the controller 28 matches the temporary route and which does not pass through the route yet. In a case where a proposal route is provided to the vehicle 12, the controller 28 associates an evaluation score of each manner item of the vehicle 12 with all links forming the proposal route, and cancels the association with the links after the vehicle 12 passes through the links. In a case where a scheduled traveling route is acquired from the vehicle 12, the controller 28 associates an evaluation score of each manner item of the vehicle 12 with all links forming the route, and cancels the association with the links after the vehicle 12 passes through the links. The controller 28 calculates an evaluation score of each manner item of the vehicle 12 before passing through a proposal route by averaging associated evaluation scores.

In a case where a manner reference score of each temporary route is recognized, the controller 28 recognizes an evaluation score of each manner item of the vehicle 12 having requested route retrieval. The evaluation score of each manner item of the vehicle 12 may be recognized by reading the evaluation score from the storage unit 27, and may be recognized based on new behavior information acquired from the vehicle 12.

The controller 28 calculates a total evaluation score by using the recognized evaluation score of each manner item of the vehicle 12. The controller 28 calculates the total evaluation score of each link, for example. The controller 28 calculates a total evaluation score of each link by averaging acquired evaluation scores of manner items that are the same as manner items used to calculate a manner reference score of each link. Therefore, in a link using some manner items used to calculate a manner reference score, a total evaluation score is calculated by averaging acquired evaluation scores of manner items that are the same as the manner items.

The controller 28 selects at least some of proposal routes as temporary routes based on comparison between the manner reference score and the total evaluation score. The controller 28 multiplies an adjustment parameter which will be described later based on the comparison between the manner reference score and the total evaluation score by cost based on a movement time or a distance defined for each link. The controller 28 selects, as a proposal route, a single temporary route in which cost is the minimum based on cost in each link, corrected by the adjustment parameter, by using a mathematical method such as a Dijkstra method. The controller 28 may select a plurality of temporary routes as proposal routes in an ascending order of cost. The controller 28 provides the selected proposal routes to the on-vehicle information processing apparatus 15 via the provision unit 26.

The adjustment parameter is a variable from 0 to 1, and is set to come closer to 1 as an absolute value of a difference between the manner reference score recognized for the link and the total evaluation score calculated for the link becomes smaller, and is set to come closer to 0 as the absolute value of the difference becomes greater. As a specific example, the controller 28 calculates the adjustment parameter by calculating (1—absolute value of difference/ manner reference score).

Next, in the present embodiment, a description will be made of a behavior information providing process executed by the controller 24 of the on-vehicle information processing apparatus 15 with reference to a flowchart of FIG. 6. The behavior information providing process is started, for example, when behavior information is provided to the information processing apparatus 10.

In step S100, the controller 24 determines whether or not an evaluation score of at least one manner item is calculable by using at least detected information that is acquired before behavior information is provided to the information processing apparatus 10 next, and, as needed, further using the past detected information stored in the storage unit 20. In a case where an evaluation score is calculable, the process proceeds to step S101. In a case where an evaluation score is not calculable, the process proceeds to step S102.

In step S101, the controller 24 calculates a calculable evaluation score of a manner item by using the acquired detected information and the past detected information selected as needed. After the calculation, the process proceeds to step S102.

In step S102, the controller 24 associates pieces of detected information that are simultaneously acquired and at least one of the evaluation scores of the manner items calculated in step S101 with user identification information stored in the storage unit 20. After the association, the process proceeds to step S103.

In step S103, the controller 24 stores the detected information and at least one of the evaluation scores of the manner items associated with the user identification information in step S102, into the storage unit 20. After the storage, the processor proceeds to step S104.

In step S104, the controller 24 provides the detected information and at least one of the evaluation scores of the manner items associated with the user identification information in step S102, to the information processing apparatus 10 as behavior information via the communication apparatus 14. After the provision, the behavior information providing process is finished.

Next, in the present embodiment, a description will be made of a behavior information acquisition process executed by the controller 28 of the information processing apparatus 10 with reference to a flowchart of FIG. 7. The behavior information acquisition process is started, for example, whenever behavior information is acquired.

In step S200, the controller 28 determines whether or not the acquired behavior information includes evaluation scores of one or more manner items. In a case where no evaluation score of a manner item is included, the process proceeds to step S201. In a case where an evaluation score of a manner item is included, the process proceeds to step S202.

In step S201, the controller 28 calculates a calculable evaluation score of a manner item of the vehicle 12 having provided the behavior information by using the acquired behavior information, and, as needed, further using the past behavior information stored in the storage unit 27. After the evaluation score of the manner item is calculated, the process proceeds to step S202.

In step S202, the controller 28 classifies the evaluation scores of the manner items included in the acquired behavior information or the evaluation scores of the manner items calculated in step S201 into any one of links stored in the storage unit 27 for each manner item. After the classification, the process proceeds to step S203.

In step S203, the controller 28 averages the evaluation score of each manner item classified into any one of the links in step S202 and the evaluation score of each manner item classified into the same link, stored in the storage unit 27. After the averaging, the process proceeds to step S204.

In step S204, the controller 28 calculates a manner reference score of each link by using the evaluation score of each manner item averaged in step S203. After the manner reference score is calculated, the process proceeds to step S205.

In step S205, the controller 28 stores the acquired behavior information for each user, the evaluation score of each manner item calculated in step S202 for each link, the evaluation score of each manner item averaged in step S203 for each link, and the manner reference score calculated in step S204 for each link, into the storage unit 27. After the storage, the behavior information acquisition process is finished.

Figure 8:
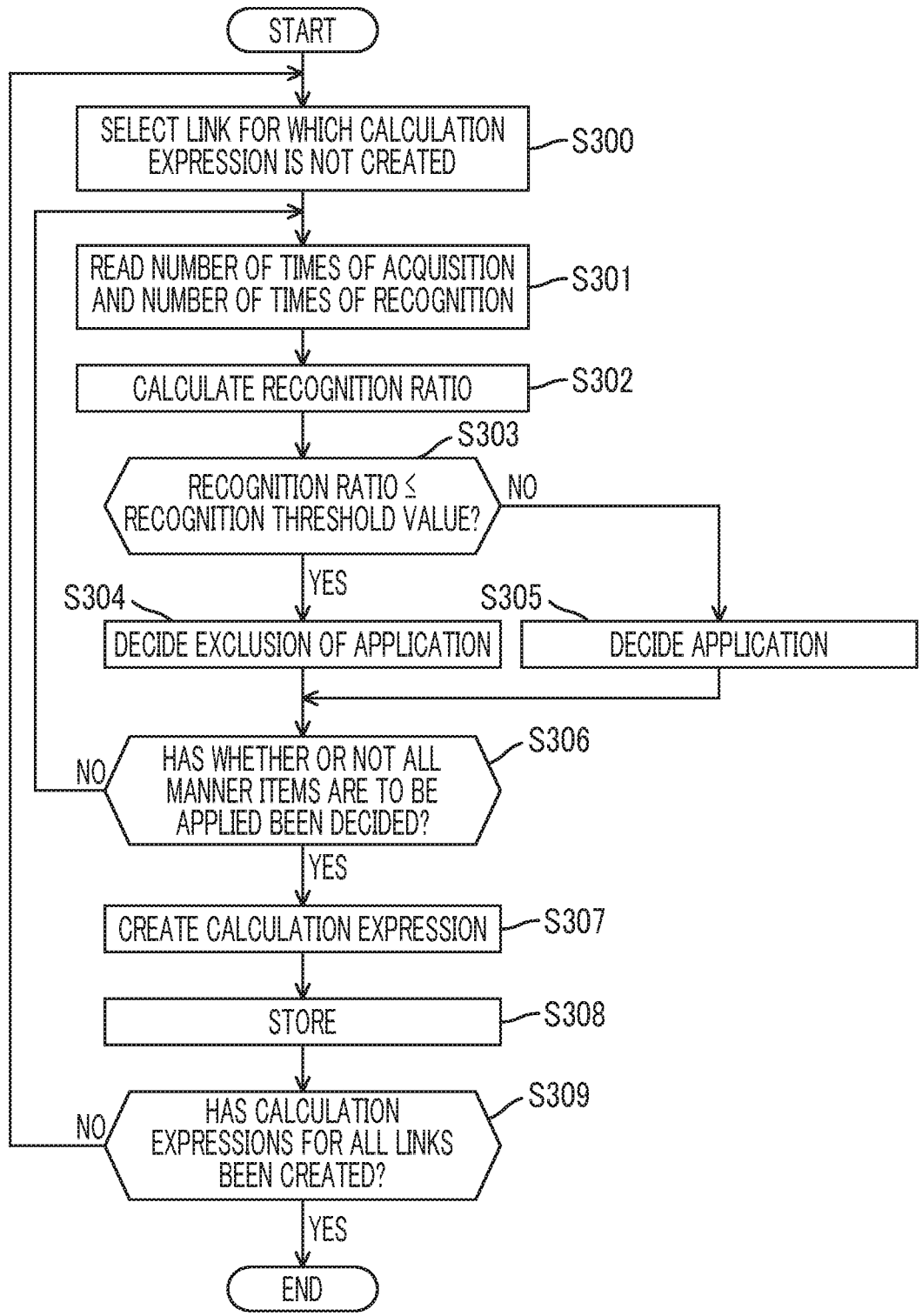
FIG. 8 is a flowchart for describing a calculation expression creation process executed by the controller in FIG. 3.

Next, in the present embodiment, a description will be made of a manner reference score calculation expression creation process executed by the controller 28 of the information processing apparatus 10 with reference to a flowchart of FIG. 8. The calculation expression creation process is started, for example, periodically or regularly.

In step S300, the controller 28 selects a link for which a calculation expression is not created after the calculation expression creation process is started. After the selection, the process proceeds to step S301.

In step S301, the controller 28 reads the number of times of acquisition of behavior information classified into the link selected in step S301 and the number of times of recognition of an evaluation score of a manner item classified into the link, from the storage unit 27. After the reading, the process proceeds to step S302.

In step S302, the controller 28 calculates a recognition ratio of the evaluation score of the manner item based on the number of times of acquisition of the behavior information and the number of times of recognition of the evaluation score of the manner item, read in step S302. After the calculation, the process proceeds to step S303.

In step S303, the controller 28 determines whether or not the recognition ratio calculated in step S302 is equal to or less than a recognition threshold value. In a case where the recognition ratio is equal to or less than the recognition threshold value, the process proceeds to step S304. In a case where the recognition ratio is not equal to or less than the recognition threshold value, the process proceeds to step S305.

In step S304, the controller 28 decides that the manner item for the evaluation score read in step S301 is not applied to calculation of a manner reference score. After the decision, the process proceeds to step S306.

In step S305, the controller 28 decides that the manner item for the evaluation score read in step S301 is to be applied to calculation of a manner reference score. After the decision, the process proceeds to step S306.

In step S306, the controller 28 determines whether or not to have decided whether or not all manner items are to be applied to a calculation expression. In a case where the controller 28 has not made decisions on all of the manner items, the process returns to step S301. In a case where the controller 28 has made decisions on all of the manner items, the process proceeds to step S307.

In step S307, the controller 28 creates a calculation expression for calculating an average value of evaluation scores of all of the manner items decided to be applied in step S305. After the creation, the process proceeds to step S308.

In step S308, the controller 28 stores the calculation expression for a manner reference score created in step S307 into the storage unit 27 in association with a link. After the storage, the process proceeds to step S309.

In step S309, the controller 28 determines whether or not calculation expressions for manner reference scores of all links have been created after the calculation expression creation process is started. In a case where the calculation expressions are not created, the process returns to step S300. In a case where the calculation expressions have been created, the calculation expression creation process is finished.

Figure 9:
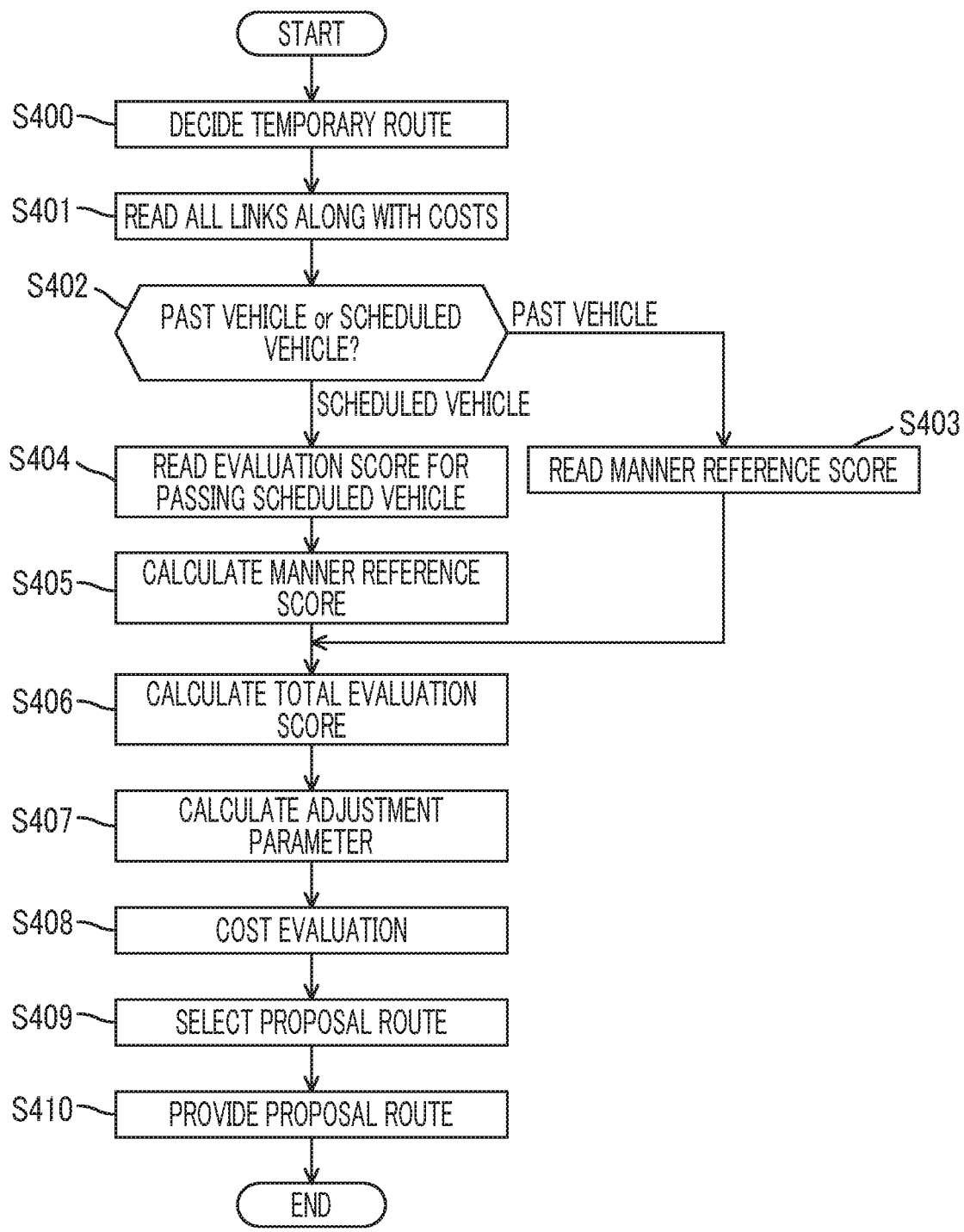
FIG. 9 is a flowchart for describing a proposal route providing process executed by the controller in FIG. 3.

Next, in the present embodiment, a description will be made of a proposal route providing process executed by the controller 28 of the information processing apparatus 10 with reference to a flowchart of FIG. 9. The proposal route providing process is started in a case where a route retrieval request is acquired from the vehicle 12.

In step S400, the controller 28 decides a plurality of temporary routes connecting two locations to each other in the acquired route retrieval request. After the decision, the process proceeds to step S401.

In step S401, the controller 28 reads all links forming the temporary routes decided in step S400 from the storage unit 27 along with costs defined for the links. After the reading, the process proceeds to step S402.

In step S402, the controller 28 determines on which manner item for an evaluation score of a scheduled vehicle scheduled to pass through a link from now on or the past vehicle having passed through the link a manner reference score used for route retrieval is to be based. Whether a manner reference score is to be based on the scheduled vehicle or the past vehicle may be set in advance in the controller 28. Alternatively, whether a manner reference score is to be based on the scheduled vehicle or the past vehicle may be set according to a specific condition as follows. For example, in a case where the number of scheduled vehicles is less than a threshold value, a manner reference score is to be based on the past vehicle, and, in a case where the number of scheduled vehicles is equal to or more than the threshold value, a manner reference score is to be based on the scheduled vehicle. In a case where a manner reference score is to be based on the past vehicle, the process proceeds to step S403. In a case where a manner reference score is to be based on the scheduled vehicle, the process proceeds to step S404.

In step S403, the controller 28 reads a manner reference score of each of the links read in step S401, from the storage unit 27. After the reading, the process proceeds to step S406.

In step S404, for each of the links read in step S401, the controller 28 reads an evaluation score of each manner item of a vehicle scheduled to pass through the link, from the storage unit 27. After the reading, the process proceeds to step S405.

In step S405, the controller 28 averages the evaluation scores of the respective manner items of the passing scheduled vehicle read in step S404. The controller 28 calculates a manner reference score of each link by using the averaged evaluation score of the respective manner items. After the calculation, the process proceeds to step S406.

In step S406, the controller 28 reads an evaluation score of each manner item of the vehicle 12 having requested route retrieval, from the storage unit 27. The controller 28 calculates a total evaluation score for the vehicle 12 having requested route retrieval for each link based on the read evaluation score of the manner item. After the calculation, the process proceeds to step S407.

In step S407, the controller 28 calculates an adjustment parameter for each link based on the manner reference score read in step S403 or the manner reference score calculated in step S405 and the total evaluation score calculated in step S406. After the calculation, the process proceeds to step S408.

In step S408, the controller 28 adjusts the cost for each link read in step S401 by using the adjustment parameter for each link calculated in step S407, and performs cost evaluation for each temporary route. After the cost evaluation, the process proceeds to step S409.

In step S409, the controller 28 selects some of the temporary routes decided in step S400 as proposal routes based on the cost evaluation performed in step S408. After the selection, the process proceeds to step S410.

In step S410, the controller 28 provides the proposal routes selected in step S409 to the on-vehicle information processing apparatus 15 via the provision unit 26. After the provision, the proposal route providing process is finished.

The information processing apparatus 10 of the present embodiment having the configuration as described above decides a plurality of temporary routes in a case where a route retrieval request is acquired from the vehicle 12, recognizes a manner reference score of each temporary route, calculates a thermal expansion coefficient by using an evaluation score of each of a plurality of manner items based on behavior information of the vehicle 12, and selects a proposal route from among the temporary routes based on the manner reference score and the total evaluation score. Generally, a user's preference for driving may be reflected in various driving behaviors of the user. As regards such an event, an evaluation score of each manner item used in the information processing apparatus 10 is calculated based on various driving behaviors, and thus a total evaluation score calculated by using evaluation scores of the respective manner items may represent multifaceted evaluation of a preference of each user for driving. A manner reference score recognized for each temporary route in the information processing apparatus 10 represents multifaceted evaluation of a driving preference of an average user of the vehicle 12 scheduled to pass through or having passed through the temporary route. Therefore, in the information processing apparatus 10, as described above, the information processing apparatus 10 compares a manner reference score with a total evaluation score, and can thus increase a probability that a temporary route in which there are many users having a preference similar to a preference in driving of a user of the vehicle 12 making a request for route retrieval may be selected as a proposal route. Therefore, the information processing apparatus 10 can present an appropriate route to a user depending on a preference of each user for driving.

For example, among a plurality of temporary routes from a certain departure location to a destination, in a case where there is a temporary route in which there are many pedestrian crossings without a traffic signal and there is a temporary route in which there are a few pedestrian crossings without a traffic signal, there is a high probability that a user having a gap between compliance with traffic rules and smoothing of traffic manner in good balance may select the latter temporary route. In such an event, in the information processing apparatus 10 of the present embodiment, a manner reference score recognized for the latter temporary route is regarded to highly tend to come closer to a total evaluation score of the user having a gap between compliance with traffic rules and smoothing of traffic manner in good balance than for the former temporary route. Therefore, there is a high probability that the information processing apparatus 10 may present a temporary route in which there are a few pedestrian crossings without a traffic signal to a user having a gap between compliance with traffic rules and smoothing of traffic manner in good balance, and thus it is possible to reduce discomfort of the user.

The information processing apparatus 10 of the present embodiment recognizes a manner reference score of each of a plurality of temporary routes based on respective evaluation scores of a plurality of manner items of the vehicle 12 having passed through each temporary route. With this configuration, the information processing apparatus 10 can calculate a manner reference score without using the vehicles 12 scheduled to travel even for a temporary route in which the number of traveling vehicles 12 is small and the reliability of evaluation of a manner reference score is low in a case of using only the traveling vehicles 12, and can thus improve the reliability of evaluation of the manner reference score.

The information processing apparatus 10 of the present embodiment recognizes a manner reference score of each of a plurality of temporary routes based on respective evaluation scores of a plurality of manner items of the vehicle 12 before passing through each temporary route. With this configuration, the information processing apparatus 10 can easily guide the vehicle 12 of a user having a similar preference for driving to the same route, and can thus present a route more suitable for a preference of each driver for driving.

In the information processing apparatus 10 of the present embodiment, some manner items used to recognize a manner reference score of a temporary route is defined for each temporary route, and a total evaluation score is calculated based on evaluation scores of the manner items used to recognize the manner reference score. Various manner items may include a manner item having a low association with a temporary route. For example, a temporary route in which the number of pedestrian crossings is small has a low association with the complete stop at a pedestrian crossing. As regards such an event, the information processing apparatus 10 may not apply an evaluation score of a manner item having a low association with a temporary route to calculation of a manner reference score and a total evaluation score. Therefore, the information processing apparatus 10 can improve the reliability of evaluation of a manner reference score for each temporary route.

In the information processing apparatus 10 of the present embodiment, whenever behavior information is acquired, a recognizable evaluation score of a manner item is recognized by using the behavior information, position information of the vehicle 12 having provided the behavior information is stored in association with the evaluation score, and a manner item used to recognize a manner reference score of each of a plurality of temporary routes is defined based on a ratio of the number of times of recognition of an evaluation score of a manner item associated with position information corresponding to a position included in each temporary route to the number of times of acquisition of the behavior information. A manner item of which the ratio of the number of times of recognition is low generally has a low association with a temporary route. Therefore, the information processing apparatus 10 having the configuration automatically estimates a manner item having a low association with a temporary route based on a recognition situation of an actual manner item. Therefore, the information processing apparatus 10 can reduce the number of steps of artificially deciding some manner items used to recognize a manner reference score.

The embodiment has been described based on the drawings and the Examples, but it should be noted that those skilled in the art can easily make various changes and modifications based on the present disclosure. Therefore, it should be noted that the changes and the modifications fall within the scope of the present disclosure. For example, functions or the like included in each means or each step can be redisposed without logical contradiction, and a plurality of means or steps can be combined into one or can be divided into more plurality of means or steps.

For example, in the embodiment, a description has been made of an example in which the communication apparatus 14 is an on-vehicle communication machine, and the on-vehicle information processing apparatus 15 is a navigation apparatus mounted on the vehicle 12. However, some or all of the processing operations executed by the communication apparatus 14 and the on-vehicle information processing apparatus 15 may be executed by any electronic apparatus such as a smart phone or a computer.

For example, in the embodiment, some of the processing operations executed in the vehicle 12 may be executed in the information processing apparatus 10, and some of the processing operations executed in the information processing apparatus 10 may be executed in the vehicle 12.

For example, a general purpose electronic apparatus such as a smart phone or a computer may function as the communication apparatus 14, the on-vehicle information processing apparatus 15, or the information processing apparatus 10 according to the embodiment. Specifically, a program in which processing contents for realizing each function of the communication apparatus 14 or the like according to the embodiment are described is stored in a memory of an electronic apparatus, and the program is read and executed by a processor of the electronic apparatus. Therefore, the disclosure related to the present embodiment can be realized as a program which is executable by a processor.

What is claimed is:

1. An information processing apparatus comprising:
a controller configured to: acquire behavior information regarding a behavior of a vehicle and a request for route retrieval between two locations from the vehicle;
decide a plurality of temporary routes connecting the two locations to each other in a case where the request for route retrieval is acquired;
recognize a manner reference score of each of the temporary routes;
recognize an evaluation score of each of a plurality of manner items based on the behavior information acquired from the vehicle having requested the route retrieval;
calculate a total evaluation score by using the evaluation score of each of the plurality of manner items;
select some of the temporary routes as proposal routes based on comparison between the manner reference score and the total evaluation score; and
provide the proposal routes to the vehicle having requested the route retrieval,
wherein at least some of the plurality of manner items used to recognize the manner reference scores of the temporary routes are defined for each of the temporary routes;
wherein the controller is further configured to:
recognize the manner reference scores of the temporary routes based on the evaluation score of each of the plurality of manner items of a vehicle having passed through each of the temporary routes;
calculate the total evaluation score based on evaluation scores of at least some of the plurality of manner items used to recognize the manner reference score of each of the temporary routes; and
recognize a recognizable evaluation score of a manner item by using the behavior information whenever the behavior information is acquired, store position information of a vehicle having provided the behavior information in association with the evaluation score, and define a manner item used to recognize the manner reference score of each of the temporary routes based on a ratio of the number of times of recognition of an evaluation score of a manner item associated with position information corresponding to a position included in each of the temporary routes to the number of times of acquisition according to of the behavior information.

2. The information processing apparatus according to claim 1, wherein the controller is further configured to recognize the manner reference scores of the temporary routes based on the evaluation score of each of the plurality of manner items of a vehicle before passing through each of the temporary routes.

3. The information processing apparatus according to claim 1, wherein:
the behavior information includes detected information that is detected by a sensor of the vehicle; and
the controller is further configured to recognize the evaluation score by calculating the evaluation score of each of the plurality of manner items based on the detected information included in the behavior information.

4. The information processing apparatus according to claim 1, wherein:
the behavior information includes the evaluation score of at least one of the plurality of manner items calculated in the vehicle; and
the controller is further configured to recognize the evaluation score of the manner item by acquiring the behavior information.

5. An information processing system comprising:
an on-vehicle processor that provides behavior information regarding a behavior of a vehicle and a request for route retrieval between two locations;
a controller configured to:
decide a plurality of temporary routes connecting the two locations to each other in a case where the request for route retrieval is acquired;
recognize a manner reference score of each of the temporary routes;
recognize an evaluation score of each of a plurality of manner items based on the behavior information acquired from the vehicle having requested the route retrieval;
calculate a total evaluation score by using the evaluation score of each of the plurality of manner items; and
select some of the temporary routes as proposal routes based on comparison between the manner reference score and the total evaluation score; and
provide the proposal routes to the vehicle having requested the route retrieval,
wherein at least some of the plurality of manner items used to recognize the manner reference scores of the temporary routes are defined for each of the temporary routes;
wherein the controller is further configured to:
recognize the manner reference scores of the temporary routes based on the evaluation score of each of the plurality of manner items of a vehicle having passed through each of the temporary routes;
calculate the total evaluation score based on evaluation scores of at least some of the plurality of manner items used to recognize the manner reference score of each of the temporary routes; and
recognize a recognizable evaluation score of a manner item by using the behavior information whenever the behavior information is acquired, store position information of a vehicle having provided the behavior information in association with the evaluation score, and define a manner item used to recognize the manner reference score of each of the temporary routes based on a ratio of the number of times of recognition of an evaluation score of a manner item associated with position information corresponding to a position included in each of the temporary routes to the number of times of acquisition according to of the behavior information.

6. A storage unit storing an information processing program causing an information processing apparatus to execute
acquiring behavior information regarding a behavior of a vehicle and a request for route retrieval between two locations from the vehicle,
deciding a plurality of temporary routes connecting the two locations to each other in a case where the request for route retrieval is acquired,
recognizing a manner reference score of each of the temporary routes,
recognizing an evaluation score of each of a plurality of manner items based on the behavior information acquired from the vehicle having requested the route retrieval,
calculating a total evaluation score by using the evaluation score of each of the plurality of manner items,
selecting some of the temporary routes as proposal routes based on comparison between the manner reference score and the total evaluation score, and
providing the proposal routes to the vehicle having requested the route retrieval,
wherein at least some of the plurality of manner items used to recognize the manner reference scores of the temporary routes are defined for each of the temporary routes;
wherein the method further includes:
recognizing the manner reference scores of the temporary routes based on the evaluation score of each of the plurality of manner items of a vehicle having passed through each of the temporary routes;
calculating the total evaluation score based on evaluation scores of at least some of the plurality of manner items used to recognize the manner reference score of each of the temporary routes; and
recognizing a recognizable evaluation score of a manner item by using the behavior information whenever the behavior information is acquired, storing position information of a vehicle having provided the behavior information in association with the evaluation score, and defining a manner item used to recognize the manner reference score of each of the temporary routes based on a ratio of the number of times of recognition of an evaluation score of a manner item associated with position information corresponding to a position included in each of the temporary routes to the number of times of acquisition according to of the behavior information.

7. An information processing method comprising:
acquiring behavior information regarding a behavior of a vehicle and a request for route retrieval between two locations from the vehicle;
deciding a plurality of temporary routes connecting the two locations to each other in a case where the request for route retrieval is acquired;
recognizing a manner reference score of each of the temporary routes;
recognizing an evaluation score of each of a plurality of manner items based on the behavior information acquired from the vehicle having requested the route retrieval;
calculating a total evaluation score by using the evaluation score of each of the plurality of manner items;
selecting some of the temporary routes as proposal routes based on comparison between the manner reference score and the total evaluation score; and
providing the proposal routes to the vehicle having requested the route retrieval,
wherein at least some of the plurality of manner items used to recognize the manner reference scores of the temporary routes are defined for each of the temporary routes;
wherein the method further includes:
recognizing the manner reference scores of the temporary routes based on the evaluation score of each of the plurality of manner items of a vehicle having passed through each of the temporary routes;
calculating the total evaluation score based on evaluation scores of at least some of the plurality of manner items used to recognize the manner reference score of each of the temporary routes; and
recognizing a recognizable evaluation score of a manner item by using the behavior information whenever the behavior information is acquired, storing position information of a vehicle having provided the behavior information in association with the evaluation score, and defining a manner item used to recognize the manner reference score of each of the temporary routes based on a ratio of the number of times of recognition of an evaluation score of a manner item associated with position information corresponding to a position included in each of the temporary routes to the number of times of acquisition according to of the behavior information.

* * * * *

UNITED STATES PATENT AND TRADEMARK OFFICE
CERTIFICATE OF CORRECTION

PATENT NO. : 11,209,283 B2
APPLICATION NO. : 16/561690
DATED : December 28, 2021
INVENTOR(S) : Hori et al.

It is certified that error appears in the above-identified patent and that said Letters Patent is hereby corrected as shown below:

On the Title Page

Item (54) and in the Specification, Column 1, Line 1:
Delete "INFORMATION PROCESSING APPARATUS, INFORMATION PROCESSING SYSTEM, STORAGE UNIT STORING INFORMATION PROCESSING PROGRAM, AND INFORMATION PROCESSING MEIHOD"
Insert --INFORMATION PROCESSING APPARATUS, INFORMATION PROCESSING SYSTEM, STORAGE UNIT STORING INFORMATION PROCESSING PROGRAM, AND INFORMATION PROCESSING METHOD--

Signed and Sealed this
Thirty-first Day of May, 2022

Katherine Kelly Vidal
*Director of the United States Patent and Trademark Office*